(12) United States Patent
Weeks et al.

(10) Patent No.: US 8,579,308 B2
(45) Date of Patent: Nov. 12, 2013

(54) SUSPENSION MODULE FOR A VEHICLE AND A METHOD OF MANUFACTURE

(75) Inventors: Gordon Aaron Weeks, Auburn Hills, MI (US); Kevin Thomas Paquette, Grosse Pointe Woods, MI (US); Paul Lawrence Barr, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 13/403,452

(22) Filed: Feb. 23, 2012

(65) Prior Publication Data

US 2013/0221706 A1     Aug. 29, 2013

(51) Int. Cl.
*B60G 7/02*     (2006.01)

(52) U.S. Cl.
USPC .................................................. 280/124.109

(58) Field of Classification Search
USPC ............ 280/124.109, 124.134, 124.135, 781, 280/785; 180/299, 312
See application file for complete search history.

(56) References Cited

U.S. PATENT DOCUMENTS

| | | | |
|---|---|---|---|
| 5,280,957 A * | 1/1994 | Hentschel et al. | 280/788 |
| 5,538,274 A | 7/1996 | Schmitz et al. | |
| 6,516,914 B1 | 2/2003 | Andersen et al. | |
| 6,733,021 B1 * | 5/2004 | Ziech et al. | 280/124.109 |
| 6,752,235 B1 * | 6/2004 | Bell et al. | 180/360 |
| 6,764,085 B1 * | 7/2004 | Anderson | 280/124.134 |
| 6,893,046 B2 * | 5/2005 | Ledesma et al. | 280/788 |
| 7,207,600 B2 * | 4/2007 | Beckmann et al. | 280/781 |
| 7,380,831 B2 | 6/2008 | Ziech et al. | |
| 7,850,181 B2 | 12/2010 | Cordier | |
| 8,096,567 B2 * | 1/2012 | Cordier | 280/124.109 |
| 8,132,821 B2 * | 3/2012 | Buschjohann et al. | 280/124.109 |
| 2011/0079978 A1 | 4/2011 | Schreiner et al. | |

* cited by examiner

*Primary Examiner* — Joseph Rocca
*Assistant Examiner* — Robert A Coker
(74) *Attorney, Agent, or Firm* — Brooks Kushman P.C.

(57) ABSTRACT

A suspension module for a vehicle and a method of manufacture. The suspension module may include a subframe assembly having at least one unitary side plate that is configured to be mounted to a vehicle. The subframe assembly may facilitate mounting of an axle subassembly and a suspension subsystem to the vehicle.

15 Claims, 4 Drawing Sheets

SUSPENSION MODULE FOR A VEHICLE AND A METHOD OF MANUFACTURE

TECHNICAL FIELD

The present application relates to a suspension module for a vehicle and a method of manufacture.

BACKGROUND

An integrated vehicle suspension, axle and frame assembly is disclosed in U.S. Pat. No. 6,516,914.

SUMMARY

In at least one embodiment a suspension module for a vehicle is provided. The suspension module may include a subframe assembly. The subframe assembly may have a unitary first side plate that is configured to be mounted to the vehicle. The first side plate may include a first wall, first and second lower control arm openings, and first and second upper control arm mounts. The first wall may have a first surface, a second surface disposed opposite the first surface, a lower surface, and an upper surface. The first and second lower control arm openings may extend from the lower surface and may receive a lower control arm. The first and second upper control arm mounts may extend from the first surface and may facilitate mounting of an upper control arm.

In at least one embodiment a suspension module for a vehicle is provided. The suspension module may include a subframe assembly having first and second side plates that are configured to be mounted to the vehicle. The first and second side plates may each have a first wall having a half shaft opening and a second wall that extends from the first wall. The second wall may have a tie rod plug hole. A tie rod plug may extend through the tie rod plug hole to facilitate mounting of a tie rod.

In at least one embodiment a method of making a suspension module is provided. The method may include casting first and second side plates as one-piece components. The first and second side plates may have a first wall and a second wall that extends from the first wall. The first wall may have a half shaft opening and first and second differential mounting pads. Material may be removed from the first and second differential mounting pads and first and second sets of differential mounting holes may be drilled through the first and second differential mounting pads to provide a desired angular position for a drive pinion gear of a differential. The differential may be assembled to the first and second side plates with fasteners that extend through the first and second sets of differential mounting holes.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
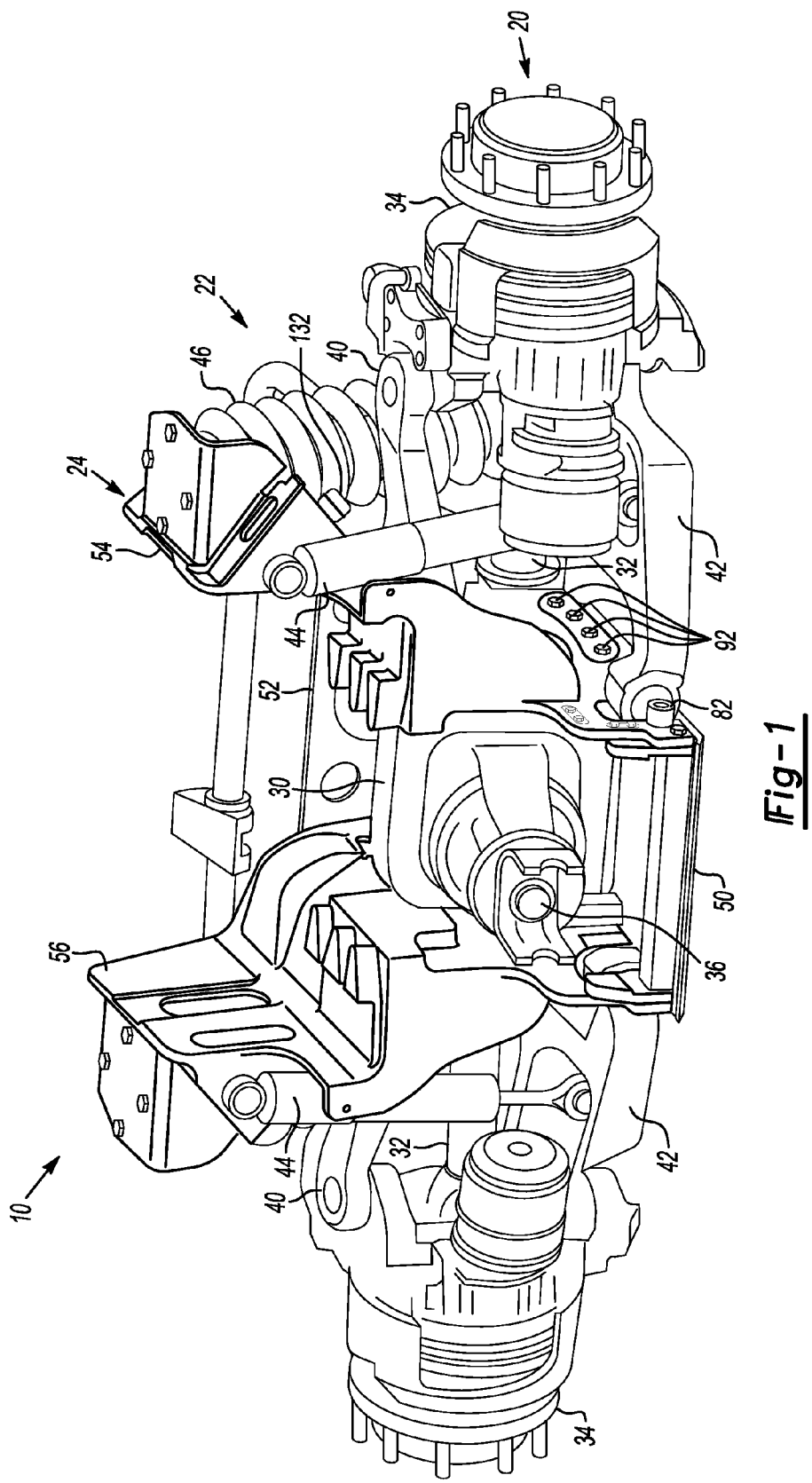
FIG. 1 is a perspective view of an exemplary suspension module.

Referring to FIG. 1, an exemplary suspension module 10 for a vehicle is shown. The suspension module 10 may be provided with a motor vehicle like a truck, bus, farm equipment, military transport or weaponry vehicle, or cargo loading equipment for land, air, or marine vessels. The suspension module 10 may include an axle subassembly 20, a suspension subsystem 22, and a subframe assembly 24.

The axle subassembly 20 may interconnect a plurality of wheel assemblies to the vehicle. In at least one embodiment, the axle subassembly 20 may include a differential 30, at least one half shaft 32, and a wheel hub assembly 34.

The differential 30 may be configured to allow different wheel assemblies to rotate at different speeds. In at least one embodiment, the differential 30 may be part of or connected to a vehicle drivetrain that may provide torque to one or more wheel assemblies. For example, a vehicle drivetrain may include at least one power source, such as an engine and/or electric motor, and a power transfer unit, such as a transmission. The power source may be coupled to an input of the power transfer unit. An output of the power transfer unit may be coupled to an input coupling 36 of the differential 30 via a drive shaft. The differential 30 may be fixedly mounted on the subframe assembly 24 as will be discussed in more detail below.

A half shaft 32 may interconnect the differential 30 to an associated wheel hub assembly 34. In FIG. 1, two half shafts 32 are provided that extend from opposite sides of the differential 30. Each half shaft 32 may extend along and may be configured to rotate about an axis. Each half shaft 32 may be coupled to an output of the differential 30 at a first end and may be fixedly coupled to a corresponding wheel hub assembly 34 at a second end.

The wheel hub assembly 34 may facilitate coupling of a wheel assembly to a half shaft 32. A wheel assembly may include a tire mounted on a wheel. The wheel may be fixedly mounted on and may rotate with the wheel hub assembly 34.

The suspension subsystem 22 may interconnect the axle subassembly 20 to the subframe assembly 24 and/or the vehicle chassis to dampen vibrations, provide a desired level of ride quality, and/or to control vehicle ride height. The suspension subsystem 22 may include an upper control arm 40, a lower control arm 42, a shock absorber 44, and a coil spring 46.

The upper and lower control arms 40, 42 may couple the subframe assembly 24 to the wheel hub assembly 34. For instance, the upper and lower control arms 40, 42 may be pivotally coupled to the subframe assembly 24 at a first end and may be coupled to the wheel hub assembly 34 at a second end that may be disposed opposite the first end. As such, the upper and lower control arms 40, 42 may permit independent movement of a half shaft 32, wheel hub assembly 34, and wheel assembly with respect to the subframe assembly 24 and differential 30.

The shock absorber 44 and coil spring 46 may be provided to control and dampen movement of the suspension subsystem 22. In the embodiment shown, the shock absorber 44 is disposed outside of the coil spring 46. The shock absorber 44 and coil spring 46 may each have a first end that is coupled to the lower control arm 42 and a second end disposed opposite the first end that may be coupled to another component, such as a chassis or frame of the vehicle or the subframe assembly 24.

The subframe assembly 24 may include a skid plate 50, a bulkhead 52, a first side plate 54, and a second side plate 56.

The skid plate 50 may be provided to prevent impact damage to components of the suspension module 10, such as the differential 30. The skid plate 50 may extend under the differential 30 and from the first side plate 54 to the second side plate 56. As such, the skid plate 50 may interconnect and position the first and second side plates 54, 56 with respect to each other.

The bulkhead 52 may also interconnect and position the first and second side plates 54, 56 with respect to each other. In the embodiment shown, the bulkhead 52 extends in a generally vertical direction and may help enclose or protect the differential 30.

The first and second side plates 54, 56 may be unitary one-piece components that are cast or molded to form an individual part. As such, the first and second side plates 54, 56 are not weldments that are fabricated by welding individual pieces together. Providing first and second side plates 54, 56 that are free of assembly welds provides many benefits over a weldment design, including reduced weight, elimination of welding operations and associated quality defects (e.g., missing welds, poor quality welds, improper weld location), improved ability to maintain design tolerances, and reduced tooling cost. The first and second side plates 54, 56 may be spaced apart from each other and disposed on opposite sides of the skid plate 50 and bulkhead 52. The first and second side plates 54, 56 may be configured as mirror images of each other in one or more embodiments. As such, the first and second side plates 54, 56 may have substantially similar configurations and features. For brevity, the first side plate 54 will be described in more detail below, noting that this description is applicable to the second side plate 56.

Figure 2:
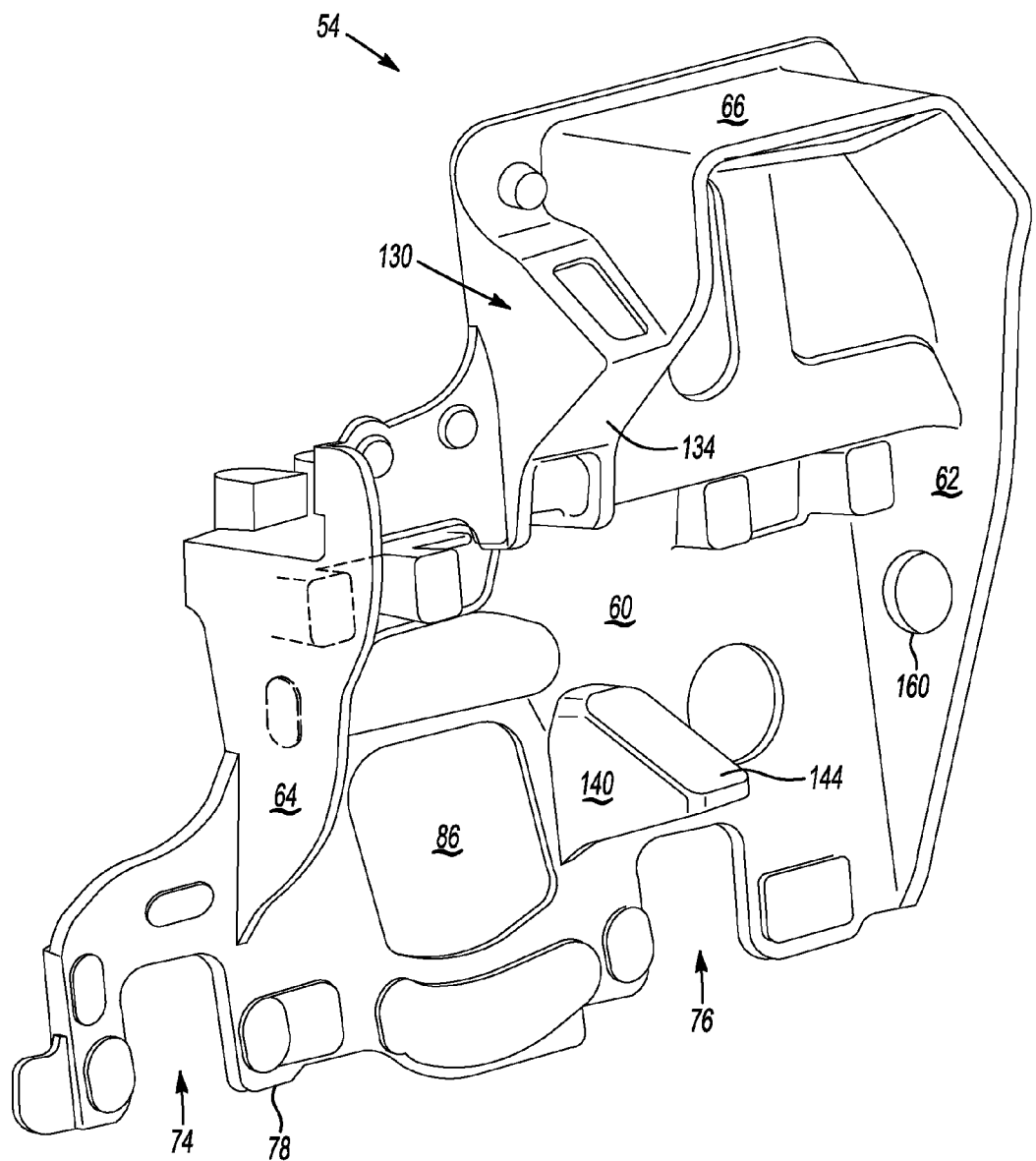
FIG. 2 is a perspective view of an embodiment of a cast side plate of the suspension module before finishing.
Figure 3:
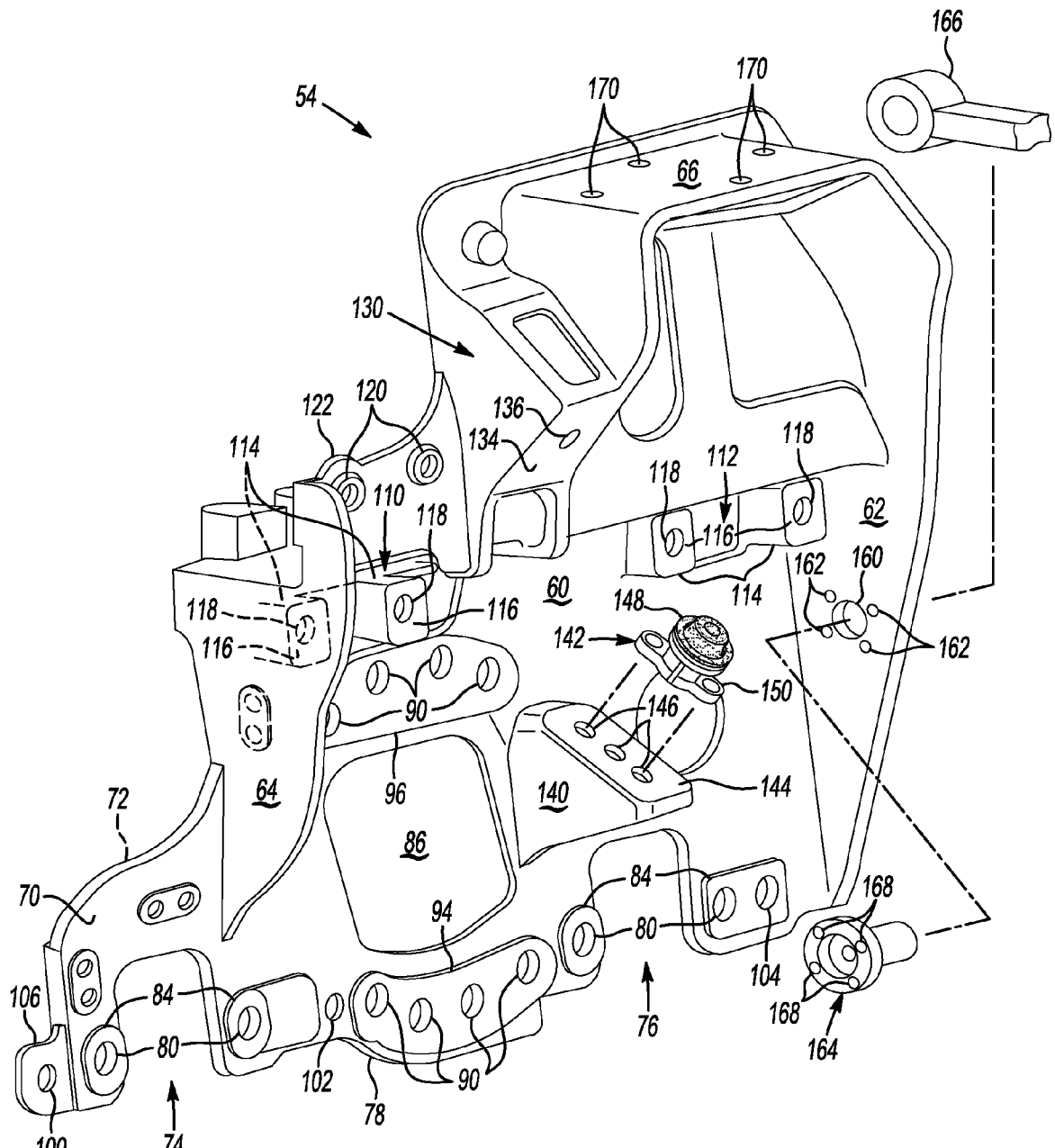
FIG. 3 is a perspective view of the side plate of FIG. 2 after finishing with various components that may be assembled to the side plate.

Referring to FIGS. 2 and 3, an embodiment of a first side plate 54 is shown in more detail. In FIG. 2, a cast first side plate 54 is shown before finishing. As such, the first side plate 54 in FIG. 2 is shown as a rough casting before machining or material removal operations. In FIG. 3, the finished first side plate 54 is shown after machining or material removal operations. Finishing operations may include drilling, reaming or thread-tapping holes, and milling, grinding, sanding or otherwise removing material from pads or surfaces that may contact another part of the subframe assembly 24. Material removal may provide substantially flat surfaces for engagement with another part. Such surfaces may surround or may be disposed adjacent to a hole or opening that may receive a fastener or another part of the subframe assembly 24.

Referring to FIGS. 1 and 3, the first side plate 54 will be described in more detail. The first side plate 54 may include a first wall 60, a second wall 62, a third wall 64, and a coil spring wall 66.

The first wall 60 may have a first surface 70 that faces toward the wheel hub assembly 34 and a second surface 72 disposed opposite the first surface 70 that faces toward and is disposed adjacent to the differential 30. The first wall 60 may include a plurality of openings and holes that facilitate assembly of the suspension module 10. For instance, the first wall 60 may have first and second lower control arm openings 74, 76 that receive an end of the lower control arm 42 and permit the lower control arm 42 to pivot. The first and second lower control arm openings 74, 76 may be spaced apart from each other and extend from the first surface 70 to the second surface 72. In addition, the first and second lower control arm openings 74, 76 may extend from a lower surface 78 of the first wall 60 such that the first and second control arm openings 74, 76 are configured as a downwardly facing open-ended slots.

A lower control arm mounting hole 80 may be disposed on opposite sides of the first lower control arm opening 74 and the second lower control arm opening 76. The lower control arm mounting holes 80 may each receive a fastener 82 (shown in FIG. 1) that couples the lower control arm 42 to the first wall 60. The lower control arm mounting holes 80 may be through holes that extend from the first surface 70 to the second surface 72. In at least one embodiment, the lower control arm mounting holes 80 may extend through a raised pad 84 that may extend from the first surface 70. The raised pad 84 may be machined to form a substantially flat or planar surface to facilitate stable positioning and mounting alignment of the lower control arm 42.

A half shaft opening 86 may be spaced apart from and generally disposed between the first and second control arm openings 74, 76. The half shaft opening 86 may be a through hole that extends from the first surface 70 to the second surface 72. A half shaft 32 may extend through the half shaft opening 86 and from the differential 30 to the wheel hub assembly 34.

A plurality of differential mounting holes 90 may be disposed adjacent to the half shaft opening 86. As is best shown in FIG. 3, a first set of differential mounting holes 90 may be provided above the half shaft opening 86 and a second set of differential mounting holes 90 may be provided below the half shaft opening 86. Each differential mounting hole 90 may be a through hole that generally extends from the first surface 70 to the second surface 72. In addition, each differential mounting hole 90 may receive a fastener 92 (shown in FIG. 1), such as a bolt, that couples the differential 30 to the first side plate 54. In at least one embodiment, first and second pads 94, 96 may be provided. The first and second pads differential mounting pads 94, 96 may be spaced apart from each other and the half shaft opening 86. The first set of differential mounting holes 90 may extend through the first differential mounting pad 94. The second set of differential mounting holes 90 may extend through the second differential mounting pad 96. The first and second differential mounting pads 94, 96 may extend from the first surface 70 and may be machined to form a substantially flat or planar surface to facilitate stable positioning and mounting alignment of the fastener 92. In the embodiment shown, four differential mounting holes 90 are disposed within the first differential mounting pad 94 and the second differential mounting pad 96. The differential mounting holes 90 and/or first and second differential mounting pads 94, 96 may be selectively configured to allow a range of positioning angles for a pinion gear associated with the differential 30. For instance, the differential mounting holes 90 and/or first and second differential mounting pads 94, 96 may be machined or angled to accommodate different pinion angles in a range of 0 to 12 degrees about the pinion axis of rotation.

A plurality of skid plate mounting holes may be provided to facilitate mounting of the skid plate 50 to the first side plate 54. In the embodiment shown, three skid plate mounting holes 100, 102, 104 are provided near the lower surface 78 of the first wall 60. The skid plate mounting holes 100, 102, 104 may be through holes that extend from the first surface 70 to the second surface 72. The first skid plate mounting hole 100 may be disposed on a tab 106 that extends from an end of the first wall 60 that is disposed opposite the second wall 62 and located near the first lower control arm opening 74. The second skid plate mounting hole 102 may be located between the first lower control arm opening 74 and the second lower control arm opening 76. In the embodiment shown, the second skid plate mounting hole 102 is disposed between the first lower control arm opening 74 and the first differential mounting pad 94. The third skid plate mounting hole 104 may be located between the second lower control arm opening 76 and the second wall 62. In at least one embodiment, the third skid plate mounting hole 104 may be located on the same raised pad 84 as a lower control arm mounting hole 80.

First and second upper control arm mounts 110, 112 may be provided to facilitate coupling of the upper control arm 40. The first and second upper control arm mounts 110, 112 may be spaced apart from each other and may receive different ends of the upper control arm 40. The first and second upper control arm mounts 110, 112 may each include a pair of mounting bosses 114 that are spaced apart from each other and extend outwardly from the first surface 70. Each upper control arm mounting boss 114 may have an end surface 116 and an upper control arm mounting hole 118. The end surface 116 may be machined to form a substantially flat or planar surface to facilitate positioning and mounting alignment of the upper control arm 40. The upper control arm mounting hole 118 may extend through and may be disposed within the end surface 116. The upper control arm mounting hole 118 may be a threaded hole that receives a fastener, such as a bolt, that couples the upper control arm 40 to the mounting boss 114. In at least one embodiment, one of the mounting bosses 114 of the first upper control arm mount 110 may be disposed adjacent to the third wall 64.

A plurality of chassis mounting holes 120 may be provided to facilitate coupling of the subframe assembly 24 to the chassis or frame of the vehicle. The chassis mounting holes 120 may be located near an upper surface 122 of the first wall 60 and above the first upper control arm mount 110. In addition, the chassis mounting holes 120 may be disposed between the second wall 62 and the third wall 64. The chassis mounting holes 120 may be through holes that extend from the first surface 70 to the second surface 72. The chassis mounting holes 120 may receive a fastener, such as a bolt, that couples the first wall 60 to the chassis.

An upper jounce bumper mount 130 may be provided for receiving an upper jounce bumper 132 (shown in FIG. 1) that cushions and limits travel of the upper control arm 40. The upper jounce bumper mount 130 may be integrally formed with the first wall 60. In addition, the upper jounce bumper mount 130 may be disposed above the first and second upper control arm mounts 110, 112 and between the chassis mounting holes 120 and the second wall 62. The upper jounce bumper mount 130 may have a mounting surface 134 that extends at an angle with respect to the first wall 60. The mounting surface 134 may have a rebound bumper mounting hole 136. The rebound bumper mounting hole 136 may be threaded and may receive a fastener, such as a bolt, that couples the rebound bumper 132 to the upper jounce bumper mount 130.

Figure 4:
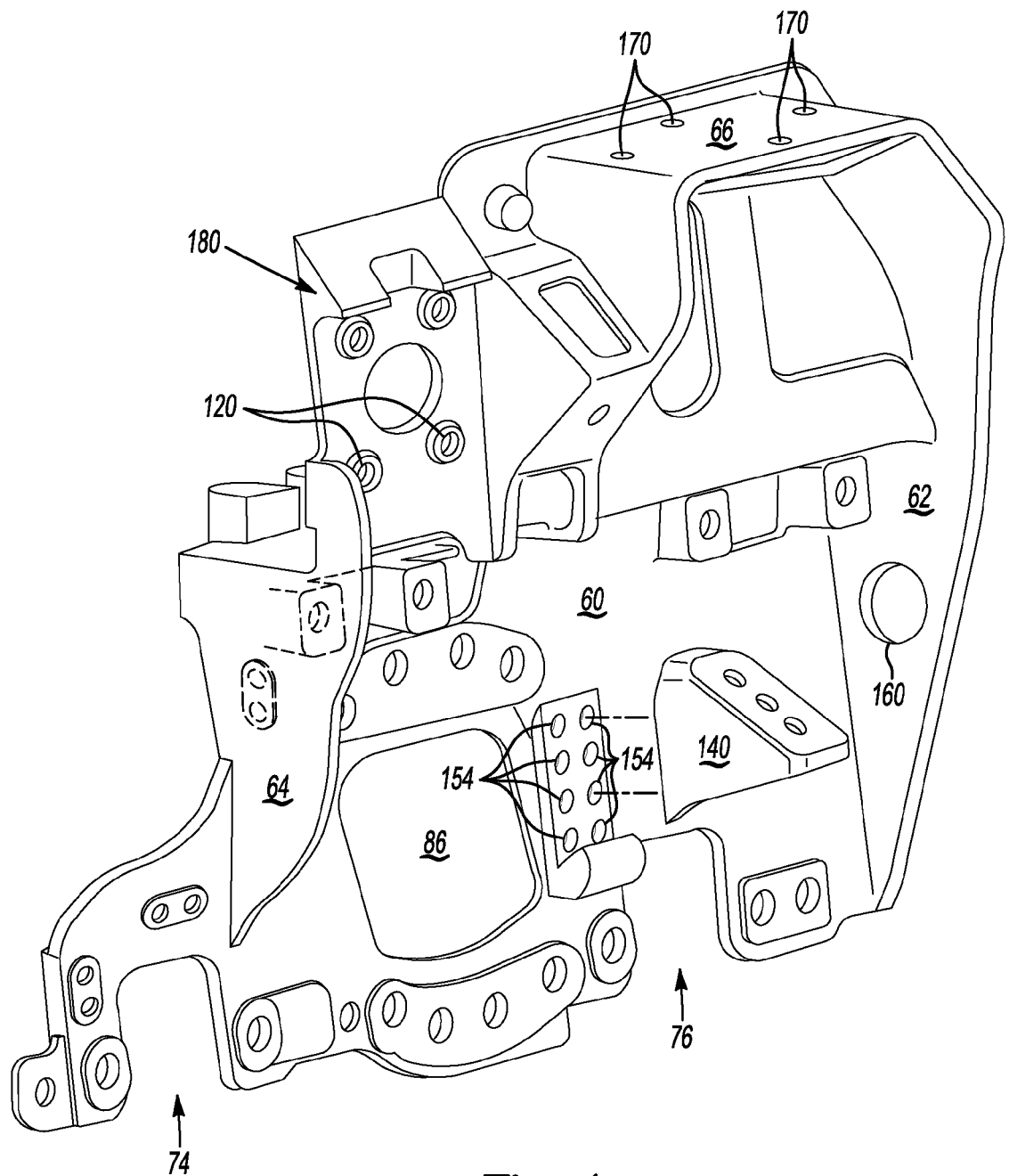
FIG. 4 is a perspective view of another embodiment of a side plate.

A lower rebound bumper mount 140 may be provided for receiving a lower rebound bumper assembly 242 that cushions and limits travel of the lower control arm 42. The lower rebound bumper mount 140 may be integrally formed with the first wall 60 as shown in FIG. 3 or may be provided as a separate component as shown in FIG. 4. The lower rebound bumper mount 140 may be disposed between the lower surface 78 of the first wall 60 and the upper jounce bumper mount 130. In addition, the lower rebound bumper mount 140 may be disposed between the half shaft opening 86 and the second wall 62. The lower rebound bumper mount 140 may have a mounting surface 144 that extends at an angle with respect to the first wall 60. The mounting surface 144 may have at least one rebound bumper mounting hole 146. A rebound bumper mounting hole 146 may be threaded and may receive a fastener, such as a bolt, that couples the lower rebound bumper assembly 242 to the lower rebound bumper mount 140. The lower rebound bumper assembly 242 may include a bumper 148 and a bumper adapter bracket 150. The bumper 148 may be coupled to the bumper adapter bracket 150 with a fastener, like a bolt. The bumper adapter bracket 150 may engage the mounting surface 144. In addition, the bumper adapter bracket 150 may facilitate adjustable positioning of the bumper 148 or positioning at different angles with respect to the lower control arm 42 and/or lower rebound bumper mount 140 in one or more embodiments.

In the embodiment shown in FIG. 3, three rebound bumper mounting holes 146 are shown. Two rebound bumper mounting holes 146 may each receive a fastener that couples a bumper adapter bracket 150 to the lower rebound bumper mount 140. The middle rebound bumper mounting hole may receive a fastener that couples a bumper 148 to the bumper adapter bracket 150 and/or the lower rebound bumper mount 140.

In the embodiment shown in FIG. 4, the lower rebound bumper mount 140 is configured as a separate component that is fastened to the first wall 60. Such an embodiment may permit adjustment of the positioning of the lower rebound bumper assembly 242. The first wall 60 may include a plurality of lower rebound bumper mount mounting holes 154. The lower rebound bumper mount mounting holes 154 may be through holes that extend from the first surface 70 to the second surface 72. In FIG. 4, eight lower rebound bumper mount mounting holes 154 are shown; however, a greater or lesser number of lower rebound bumper mount mounting holes 154 may be provided in various embodiments. A fastener, such as a bolt, may be inserted through a cavity in the lower rebound bumper mount 140 or from the second surface 72 to engage and secure the lower rebound bumper mount 140 to the first wall 60.

The second wall 62 may extend from an end of the first wall 60 and away from the second surface 72. The second wall 62 may also extend in a generally vertical direction from the lower surface 78 of the first wall 60 to the coil spring wall 66. The second wall 62 may include a tie rod plug hole 160 and a plurality of tie rod plug mounting holes 162. The tie rod plug hole 160 and tie rod plug mounting holes 162 may be through holes that extend through the second wall 62. The tie rod plug mounting holes 162 may be threaded. A tie rod plug 164 may extend through the tie rod plug hole 160 to facilitate mounting of a tie rod 166 that may extend from the tie rod plug 164 to the wheel hub assembly 34. The tie rod plug 164 may have mounting holes 168 that are aligned with the tie rod plug mounting holes 162. A fastener, such as a bolt, may extend through each mounting hole 168 and a corresponding tie rod plug mounting hole 162 to secure the tie rod plug 164 to the second wall 62.

The coil spring wall 66 may extend from the first wall 60 may extend from an end of the second wall 62. At least a portion of the coil spring wall 66 may extend generally horizontally or perpendicular from the first wall 60 in one or more embodiments. The coil spring wall 66 may cooperate with the second wall 62 to at least partially define a pocket that receives and end of the coil spring 46. The coil spring wall 66 may be configured to receive force from and facilitate mounting of the coil spring 46. For example, the coil spring wall 66 may be provided with a plurality of coil spring mounting holes 170 that may receive a fastener, such as a bolt, for positioning and securing the coil spring 46. The coil spring mounting holes 170 may be configured as through holes that may be spaced apart from each other and may be drilled into the coil spring wall 66 in one or more embodiments.

Referring again to FIG. 4, a second embodiment of the first side plate 54 is shown. This embodiment is similar to the embodiment shown in FIG. 3. In FIG. 4, the lower rebound bumper mount 140 is illustrated as a separate component as previously discussed. In addition, the first wall 60 includes a shock absorber mount 180 that may receive and engage the second end of the shock absorber 44. The shock absorber mount 180 may be integrally formed with the first wall 60. The shock absorber mount may be generally disposed above the chassis mounting holes 120 and between the third wall 64 and the upper jounce bumper mount 130. It is also contemplated that the first side plate 54 in FIG. 3 may be provided with a shock absorber mount 180.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A suspension module for a vehicle, comprising:
a subframe assembly having a unitary first side plate that is configured to be mounted to the vehicle, the first side plate including:
a first wall having a first surface, a second surface disposed opposite the first surface, and a lower surface that extends from the first surface to the second surface;
first and second lower control arm openings that extend from the lower surface and that are configured to receive a lower control arm; and
first and second upper control arm mounts that extend from the first surface and that facilitate mounting of an upper control arm.

2. The suspension module of claim 1 wherein the first wall has an upper jounce bumper mount having a mounting surface that extends at an angle with respect to the first wall, wherein an upper jounce bumper is disposed proximate the mounting surface for limiting travel of the upper control arm.

3. The suspension module of claim 1 wherein the first wall has a lower rebound bumper mount having a mounting surface that extends at an angle with respect to the first wall, wherein a lower rebound bumper assembly is disposed proximate the mounting surface for limiting travel of the lower control arm.

4. The suspension module of claim 3 wherein the lower rebound bumper assembly includes a bumper adapter bracket that engages the mounting surface and a bumper that is mounted on the bumper adapter bracket.

5. The suspension module of claim 3 wherein the first wall further comprises a half shaft opening for receiving a half shaft and wherein the first side plate further comprises a second wall that extends from an end of the first wall, wherein the lower rebound bumper mount is disposed between the half shaft opening and the second wall.

6. The suspension module of claim 5 wherein the second wall is configured to receive a tie rod plug that facilitates coupling of a tie rod to the first side plate and wherein the first side plate further comprises a coil spring wall that extends from the first and second walls.

7. The suspension module of claim 3 wherein the first wall further comprises a half shaft opening and a plurality of lower bumper mount mounting holes that are disposed adjacent to the half shaft opening, and wherein a fastener extends from each of the lower bumper mount mounting holes to the lower rebound bumper mount to couple the lower rebound bumper mount to the first wall.

8. A suspension module for a vehicle, comprising:
a subframe assembly having first and second side plates that are configured to be mounted to the vehicle, the first and second side plates each including:
a first wall having a half shaft opening; and
a second wall that extends from the first wall, the second wall having a tie rod plug hole; and
a tie rod plug that extends through the tie rod plug hole, wherein the tie rod plug facilitates mounting of a tie rod.

9. The suspension module of claim 8 wherein the first and second side plates are one-piece components that are provided free of weld seams.

10. The suspension module of claim 8 wherein the first and second side plates each have an upper jounce bumper mount that is integrally formed with the first wall, wherein the upper jounce bumper mount is configured to receive a bumper that engages an upper control arm that is pivotally coupled to the first wall.

11. The suspension module of claim 10 wherein the first and second side plates each have a lower rebound bumper mount that is disposed on the first wall, wherein the lower rebound bumper mount is configured to receive a rebound bumper assembly that engages a lower control arm that is pivotally coupled to the first wall.

12. The suspension module of claim 11 wherein the first wall includes a lower rebound bumper mount mounting hole that receives a fastener that couples the lower rebound bumper mount to the first wall.

13. The suspension module of claim 11 wherein the lower rebound bumper mount is disposed between the half shaft opening and the second wall.

14. The suspension module of claim 10 wherein the first wall includes an integral shock absorber mount that is disposed above the half shaft opening and adjacent to the upper jounce bumper mount.

15. The suspension module of claim 8 further comprising first and second lower control arm openings that are spaced apart from each other and are configured as open slots that extend from a lower surface of the first wall and a skid plate that extends from the first side plate to the second side plate.

* * * * *